United States Patent [19]

Fosdick

[11] 3,757,308

[45] Sept. 4, 1973

[54] DATA PROCESSOR

[75] Inventor: Robert E. Fosdick, Austin, Tex.

[73] Assignee: Texas Instruments Incorporated, Dallas, Tex.

[22] Filed: Sept. 3, 1971

[21] Appl. No.: 177,735

[52] U.S. Cl. .............................. 340/172.5, 235/168

[51] Int. Cl. .............................................. G06f 7/385

[58] Field of Search .................. 340/172.5; 307/303, 307/238, 221; 235/168, 170

[56] References Cited

UNITED STATES PATENTS

| | | | |
|---|---|---|---|
| 3,480,768 | 11/1969 | Sogge | 235/168 |
| 3,597,641 | 8/1971 | Ayres | 307/303 |
| 3,400,259 | 9/1968 | Maczko et al. | 235/168 |
| 3,584,206 | 6/1971 | Evans | 235/170 |
| 3,486,015 | 12/1969 | Asada et al. | 235/170 |
| 3,609,712 | 9/1971 | Dennard | 307/238 |
| 3,641,511 | 2/1972 | Cricchi et al. | 307/238 |

*Primary Examiner*—Paul J. Henon
*Assistant Examiner*—Mark Edward Nusbaum
*Attorney*—Harold Levine, John G. Graham et al.

[57] ABSTRACT

A MOS data processor fabricated on a single MOS semiconductor chip. The logic, arithmetic and storage functions are fabricated on one semiconductor chip.

2 Claims, 8 Drawing Figures

RS2, RS1, REF, LS1 ARE MUTALLY EXCLUSIVE SIGNALS SYNCHED TO φ4

DATA PROCESSOR

This invention is directed to a unit processor and more particularly to a unit processor used in an associative processor.

It is particularly directed to a unit processor fabricated with MOS circuit techniques.

A unit processor is one of many processors used in an associative data processor. The unit processor described herein is fabricated in total on one MOS chip.

It is an object of this invention to provide a new and improved data processor.

It is another object of this invention to provide a data processor on a single slice designed for high speed.

It is another object of this invention to provide a new and improved refresh circuitry for a register.

It is another object of this invention to provide a new and improved data processor having unique arithmetic and logic functions.

Figure 1:
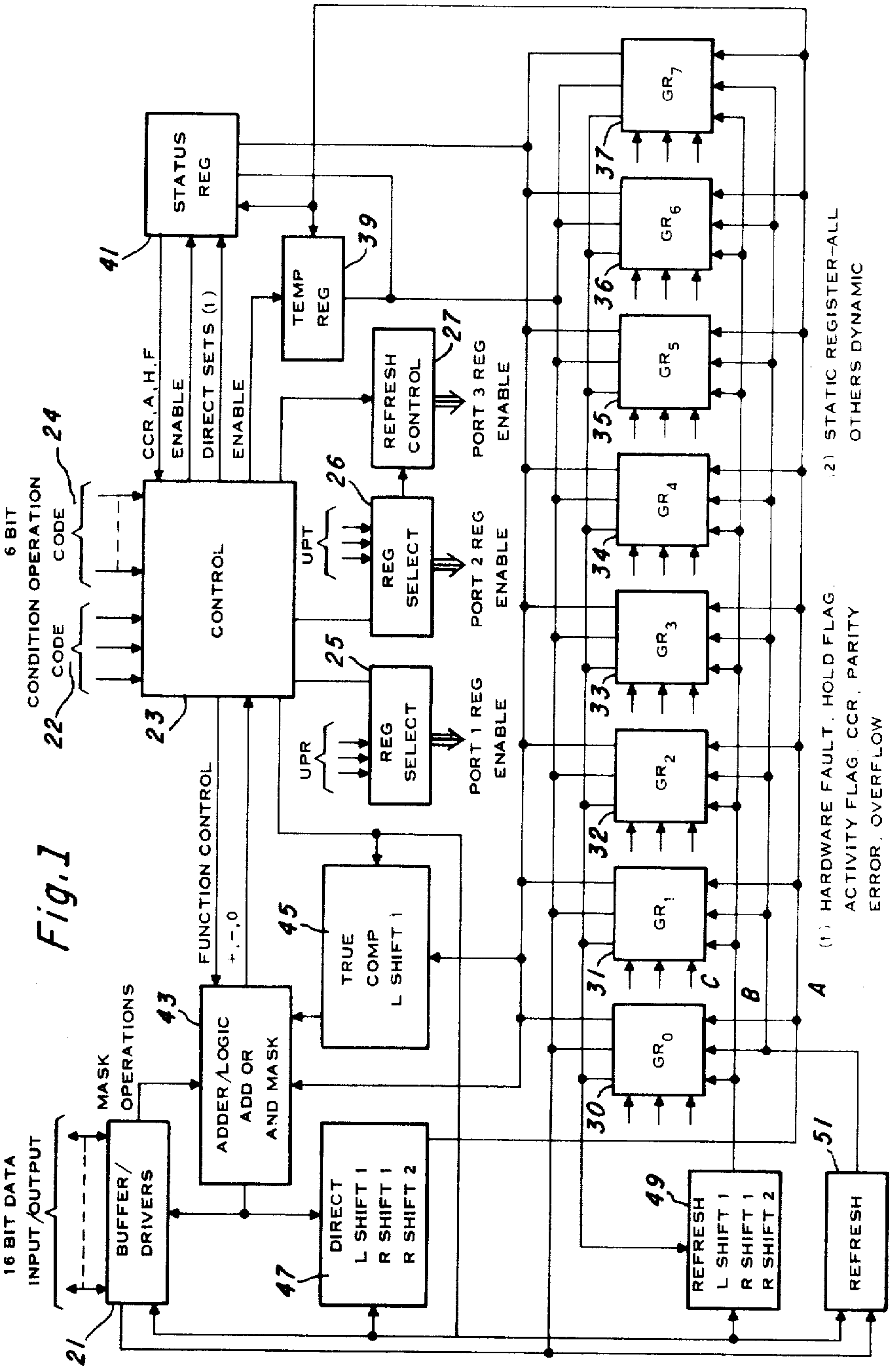
FIG. 1 shows a block diagram of the unit processor.

FIG. 1 shows a unit processor used in an associative processor. The input/output data to and from the unit processor is on input lines connected to the buffer drivers 21. The control logic 23 receives a condition code on three input lines 22 and a six bit operation code on operation code input lines 24. The control circuits 23 apply control signals to the register select 25–26. The inputs from the control 23 to the register selects 25–26 determine which one of these register selects become active. The control 23 also applies an input control to the refresh control 27. The UPR inputs to the register select 25 and the UPT inputs to register select 26 operate to control the register selects 25 and 26 to designate which of the general registers 30–37 are going to be operated on. Normally the refresh control 27 operates continuously however on double linked words, it will need to make special control functions. Each of the general registers 30–37 have three input and output ports. These input/output ports are labelled A, B and C. The input ports are labelled A, B, C and the output ports A', B', C' for each of the general registers 30–37. Port 1 is A for the input and A' for the output. Port 2 is B for the input and B' for the output and port 3 is C for the input and C' for the output. The control 23 applies an enable pulse to a temporary or working register 39. The enable pulse applied to the temporary register 39 enables the temporary working register to be used when double length words are being used. There are also inputs to temporary register 39 used in the multiply and divide modes. There are inputs to a status register 41 from the control circuit 23, an enable input and a direct set input. Status register 41 is used in the associative processing and contains a fault bit, a hold bit, activity bit and a condition code register. The status register 41 also contains an eight bit flag, parity indication and overflow. The control circuit 23 also applies control signals to the adder logic 43. This controls the arithmetic and logic functions carried out in the adder logic 43 on the 16-bit input data. Control is also applied from circuit 23 to a true complement, left shift one circuit 45. The true complement, left shift one circuit 45 manipulates the outputs from the general registers 30–37 into the adder/logic 43. There is also a control signal applied to a direct left shift one, right shift one, right shift two, logic manipulator 47. The data through logic 47 comes out of the adder 43, manipulates the data and inputs to port 1 of the general registers 30–37. The outputs from the logic 47 also go into the temporary register 39 and the status register 41. Control signals are also applied from control 23 to the refresh, left shift one, right shift one, right shift two circuit 49 which is a port 3 manipulator of the general registers 30–37. This control circuit manipulation circuitry 49 also does the sequential refresh of the general registers 32–37. The refresh circuitry 51 is the manipulation to the output of port 2. This performs the operation if simply added in to refresh the general registers 30–37.

Describing now the flow of data from the I/O buffer driver 21 through, into and out; the data on the I/O buffer driver 21 is applied to the general registers 30–37 via port 2 through the adder to set the general registers 30–37 to the input data. The input data from the I/O buffer drivers 21 may also be stored in the temporary register 39 and the status register 41. Each general register 30–37 is a 16 bit register. Each register is a three port register with three input ports and three output ports. After information or data has been stored in any one of the general registers 32–37 arithmetic and logic functions can be performed on it in the true complement, left shift one circuit 45, and the adder logic circuit 43.

TABLE I shows the instructions for the unit processor shown in FIG. 1. These instructions control the operations carried out in the unit processor.

TABLE I

| FUNCTION | COMMAND CODE | OPERATION | COMMENTS | REGISTER SELECT UPR | UPT | TEMP | STATUS | ADDER OPERATION | OTHER | PORT1 | PORT2 | PORT3 |
|---|---|---|---|---|---|---|---|---|---|---|---|---|
| ADD | | | | | | | | | | | | |
| ADD | 0 0 0 0 0 0 | (UPR)+DI→UPR | Reg to Input | $GR_o-GR_1$ | -- | -- | PARITY→P FAULT→OF | ADD | | R | DI | REFR |
| ADDR | 0 0 1 0 0 0 | (UPR)+(UPT)→UPR | Reg to Reg | $GR_o-GR_1$ | $GR_o-GR_9$ | -- | FAULT→OF | ADD | | R | T | REFR |
| SUBRACT | | | | | | | | | | | | |
| SUB | 0 0 0 0 0 1 | (UPR)-DI→UPR | Reg to Input | $GR_o-GR_7$ | -- | -- | PARITY→P FAULT→OF | ADD | CARRY IN | R | $\overline{DI}$ | REFR |
| SUBR | 0 0 1 0 0 1 | (UPR)-(UPT)→UPR | Reg to Reg | $GR_o-GR_7$ | $GR_o-GR_7$ | -- | FAULT→OF | ADD | CARRY IN | R | $\overline{(UPT)}$ | REFR |
| MULTIPLY | | | | | | | | | | | | |
| MP | 0 0 1 1 1 1 | C=0: TTOPC 00 00, 01 10, 10 -21, 11 -11; C=1: TTOPC 00 10, 01 20, 10 -11, 11 01 | Proceed by LT or LTR 2 bit multiply step | Accumulator MSB ANS | Multiplier &LSB ANS | Hold multiplicand | FAULT→OF | ADD | Conditional IN, OUT,+,-, carry | R | TEMP | T |
| MPL | 0 0 1 1 1 0 | RECODE TABLE (UPT)-(OUP);$R_{15}$→$T_{15}$ | Last multiply step sign LSB REG (UPT) | Accumulator MSB ANS | Multiplier &LSB ANS | Hold multiplicand | FAULT→OF | ADD | Conditional In, out, +, -, carry | R | TEMP | T |
| DIVIDE | | | | | | | | | | | | |
| DT | 0 1 1 1 1 1 | (UPT)X 2→UPT ($R_{15}$)→$D_{PD}$ | Divide set-up strip sign | $GR_o-GR_7$ | $GR_o-GR_7$ | -- | -- | ADD | -- | R | —, 15=0's | T Sh LT1 Lg |
| D | 0 0 1 1 0 1 | ($R_{15}$)=($TR_5$); (UPR)-(TEMP)→[TEMP·2]+$T_{15}$, [(UPT)·2]+1→T ($R_{15}$)≠($TR_5$); (UPR)+(TEMP)→(TEMP·2)+$T_{15}$, [(UPT)·2]+0→UPT] | Single bit non-restoring divide step | $GR_o-GR_7$ Dividend (MSB)→ remainder | $GR_o-GR_7$ Dividend (LSB) quotient | Hold divisor | FAULT→OF NOT ON SHIFT | ADD | Conditional In, out,+,-, carry | R | TEMP | T Sh LFT |

TABLE I (Continued)

| FUNCTION | COMMAND CODE | OPERATION | COMMENTS | REGISTER SELECT: UPR | REGISTER SELECT: UPT | REGISTER SELECT: TEMP | REGISTER SELECT: STATUS | ADDER: OPERATION | ADDER: OTHER | PORT1 | PORT2 | PORT3 |
|---|---|---|---|---|---|---|---|---|---|---|---|---|
| DIVIDE (Cont'd) RFX | 0 0 1 0 1 0 | $(T_{15})=0$, NO OP $(T_{15})=1$, (UPT)+1→UPT | Quotient fix | -- | $GR_0-GR_7$ | UNCHG | FAULT→OF | ADD | Conditional carry in | 0's | T | REFR |
| RFX | 0 0 1 1 0 0 | $(R_{15})=(T_{15})$, NO OP $(R_{15})+(T_{15})$, (UPR)+(TEMP)→UPR | Remainder fix | $GR_0-GR_7$ | -- | UNCHG | FAULT→OR | ADD | | R | TEMP | REFR |
| LOAD -- | | | | | | | | | | | | |
| L | 1 0 0 0 0 0 | DI→UPR | Data in to Reg | $GR_0-GR_7$ | -- | -- | PARITY→P | AND | Carry - | 1's | DI | REFR |
| LR | 1 0 1 0 0 0 | (UPT)→UPR | REG to REG | $GR_0-GR_7$ | $GR_0-GR_7$ | -- | -- | AND | Carry - | 1's | T | REFR |
| LT | 1 0 0 1 0 0 | DI→TEMP | Use prior to MP&D | -- | -- | From adder | PARITY→P | AND | Carry - | 1's | DI | REFR |
| LTR | 1 0 1 1 0 0 | (UPT)→TEMP | Use prior to MP&D | -- | $GR_0-GR_7$ | From adder | -- | AND | Carry - | 1's | T | REFR |
| LTC | 0 1 0 0 1 1 | $(\overline{DI})$+1→UPR | 2's comp in | $GR_0-GR_7$ | -- | -- | PARITY→P | OR | Carry in | C's | DI | REFR |
| LTCR | 0 1 1 0 1 1 | $(\overline{UPT})$+1→UPR | 2's Reg to Reg | $GR_0-GR_7$ | $GR_0-GR_7$ | -- | -- | OR | Carry in | 0's | T | REFR |
| LOC | 1 0 0 0 1 0 | $(\overline{DI})$→UPR | 1's comp in | $GR_0-GR_7$ | -- | -- | PARITY→P | AND | Carry - | 1's | DI | REFR |
| LOCR | 1 0 1 0 1 0 | $(\overline{UPT})$→UPR | 1's comp Reg-Reg | $GR_0-GR_7$ | $GR_0-GR_7$ | -- | -- | AND | Carry - | 1's | T | REFR |
| LS | 1 0 0 1 1 0 | DI→Status Reg | ROLL-IN | -- | -- | -- | DI→Stat Reg PARITY→P | AND | Carry - | 1's | DI | REFR |

TABLE I (Continued)

| FUNCTION | COMMAND CODE | OPERATION | COMMENTS | REGISTER SELECT UPR | UPT | TEMP | STATUS | ADDER OPERATION | OTHER | PORT1 | PORT2 | PORT3 |
|---|---|---|---|---|---|---|---|---|---|---|---|---|
| LOAD (Cont'd) | | | | | | | | | | | | |
| LAV | 1 0 1 1 1 0 | (temp)→UPR | temp Reg. output | $GR_o$-$GR_7$ | | -- | -- | AND | Carry - | 1's | temp | REFR |
| LRS | 1 0 1 1 0 1 | 0's→UPR $T_1$,$T_o$→B,A; 0→C | Multiply set up Zero Reg | $GR_o$-$GR_7$ | $GR_o$-$GR_7$ | -- | -- | AND | | | 1's | T set up Recode |
| SHIFT | | | | | | | | | | | | |
| SLA | 0 1 1 0 0 1 | (UPR)·2→UPR ($R_{15}$)→$R_{15}$ | Thru adder | $GR_o$-$GR_7$ | -- | -- | FAULT→OF | OR | | F | $\overline{1}$'s= o's | REFR |
| SFA | 0 1 1 0 0 0 | (UPR)÷2→UPR ($R_{15}$)→$R_{15}$ | Thru adder | $GR_o$-$GR_7$ | -- | -- | -- | OR | | F | $\overline{1}$'s= o's | REFR |
| SLL | 0 1 1 1 0 1 | (UPR)·2→UPR | Thru adder | $GR_o$-$GR_7$ | -- | -- | -- | OR | | F | $\overline{1}$'s= o's | REFR |
| SRL | 0 1 1 1 0 0 | (UPR)÷2→UPT | Thru adder | $GR_o$-$GR_7$ | -- | -- | -- | OR | | F | $\overline{1}$'s= o's | REFR |
| SLAD | 1 1 1 0 0 1 | (UPR,UPT)·2→UPR, UPT ($R_{15}$)→$R_{15}$,($T_{15}$)→$T_{15}$ | UPR thru adder UPT Port3 shift | $GR_o$-$GR_7$ | $GR_o$-$GR_7$ | -- | FAULT→OF UPR only | OR | Conditional carry - | F | $\overline{1}$'s= o's | T |

TABLE I (Continued)

| FUNCTION | COMMAND CODE | OPERATION | COMMENTS | REGISTER SELECT UPR | REGISTER SELECT UPT | REGISTER SELECT TEMP | REGISTER SELECT STATUS | ADDER OPERATION | ADDER OTHER | PORT1 | PORT2 | PORT3 |
|---|---|---|---|---|---|---|---|---|---|---|---|---|
| **SHIFT** (Cont'd) | | | | | | | | | | | | |
| SRAD | 1 1 1 0 0 0 | (UPR,UPT)÷2→UPR, UPT $(R_{15})\to R_{15}$, $(T_{15}\to T_{15})$ | UPR thru adder UPT Port3 shift | $GR_o$-$GR_7$ | $GR_o$-$GR_7$ | -- | -- | OR | | R | $\overline{1}$'s= o's | T |
| SLLD | 1 1 1 1 0 1 | (UPR,UPT)·2→UPR, UPT | UPR thru adder UPT Port3 shift | $GR_o$-$GR_7$ | $GR_o$-$GR_7$ | -- | -- | OR | Conditional carry in | R | $\overline{1}$'s= o's | T |
| SRLD | 1 1 1 1 0 0 | (UPR,UPT)÷2→UPR, UPT | UPR thru adder UPT Port3 shift | $GR_o$-$GR_7$ | $GR_o$-$GR_7$ | -- | -- | OR | | R | $\overline{1}$'s= o's | T |
| ROT | 0 1 1 1 1 0 | (UPR)÷2→UPR $(K_o)\to R_{15}$ | Thru adder | $GR_o$-$GR_7$ | -- | -- | -- | OR | | R | $\overline{1}$'s= o's | REFR |
| ROTD | 1 1 1 1 1 0 | (UPR,UPT)÷2→UPR, UPT $(T_o)\to R_{15}$ | UPR thru adder UPT Port3 shift | $GR_o$-$GR_7$ | $GR_o$-$GR_7$ | -- | -- | OR | | R | $\overline{1}$'s= o's | T |
| **COMPARE** | | | | | | | | | | | | |
| CMP | 0 0 0 0 1 0 | (UPR):DI | Conditional set of CCR | $GR_o$-$GR_7$ | -- | -- | PARITY→P CMP→CCR | ADD | Carry in | R | $\overline{DI}$ | REFR |
| CMPR | 0 0 0 0 1 1 | [(UPR):(UPT)]ΛDI | DI in mask | $GR_o$-$GR_7$ | $GR_o$-$GR_7$ | -- | PARITY→P CMP→CCR | ADD | Carry in | R | $\overline{T}$ | REFR |

TABLE I (Continued)

| FUNCTION | COMMAND CODE | OPERATION | COMMENTS | REGISTER SELECT UPR | UPT | TEMP | STATUS | ADDER OPERATION | OTHER | PORT1 | PORT2 | PORT3 |
|---|---|---|---|---|---|---|---|---|---|---|---|---|
| AND | | | | | | | | | | | | |
| AND | 1 0 0 0 0 1 | (UPR) ∧ DI → UPR | Reg to Input | $GR_o - GR_7$ | -- | -- | PARITY→P | AND | Carry - | R | DI | REFR |
| ANDR | 1 0 1 0 0 1 | (UPR) ∧ (UPT) → UPR | Reg to Reg | $GR_o - GR_7$ | $GR_o - GR_7$ | -- | -- | AND | Carry in | R | T | REFR |
| OR | | | | | | | | | | | | |
| OR | 0 1 0 0 1 - | (UPR) v DI → UPR | Reg to Input | $GR_o - GR_7$ | -- | -- | PARITY→P | OR | | R | DI | REFR |
| ORR | 0 1 1 0 1 - | (UPR) v (UPT) → UPR | Reg to Reg | $GR_o - GR_7$ | $GR_o - GR_7$ | -- | -- | OR | | R | T | REFR |
| STORE | | | | | | | | | | | | |
| S | 1 1 0 0 1 0 | (UPR) → DO, PAR → $DO_{16}$ (OUT) (CCR) (A) ($\overline{TRU}$) → SUC | Priority control for Global out extra control thru UPT | $GR_o - GR_u$ | To → SUC TRU > $T_1$ | -- | -- | -- | -- | CUT | -- | REFR |
| ST | 1 1 0 1 1 0 | (Temp) → DO, PAR → $DO_{16}$ (OUT) (CCR) (A) ($\overline{TRU}$) → SUC | Priority control for Global out extra control thru UPT | -- | $T_o$ → SUC TRU → $T_1$ | Output | -- | -- | | CUT | -- | REFR |
| SS | 1 1 0 1 0 1 | (ST Reg) → DO, PAR → $DO_{16}$ | Direct store of status Reg to UM only | -- | -- | -- | Output | -- | | CUT | -- | REFR |
| NORMALIZE | | | | | | | | | | | | |
| NRM | 0 0 1 0 1 1 | [(UPT) ·2] N → UPT (UPR) + N → UPR | Instruction could require 14 cycles - N is cycles when significance reached | $GR_o - GR_7$ | $GR_o - GR_7$ | -- | -- | ADD | Carry in | R | $\overline{1}$'s = o's | T (SHIFT) |

TABLE I (Continued)

| FUNCTION | COMMAND CODE | OPERATION | COMMENTS | REGISTER SELECT: UPR | REGISTER SELECT: UPT | REGISTER SELECT: TEMP | REGISTER SELECT: STATUS | ADDER: OPERATION | ADDER: OTHER | PORT1 | PORT2 | PORT3 |
|---|---|---|---|---|---|---|---|---|---|---|---|---|
| **SET BIT(S)** | | | | | | | | | | | | |
| SETR | 1 0 0 1 0 1 | (UPR)∧(TEMP)∨DI→UPR | Precede by LT or LTR bit manipulator | $GR_o$-$GR_7$ | -- | AND MASK | PARITY→P | Special | Carry - | R | TEMP | REFR |
| SETS | 1 0 0 1 1 1 | (St Reg)∧(TEMP)∨DI→St Reg | Precede by LT or LTR bit manipulator | -- | -- | AND MASK | (STREG)→STPS PARITY→P | Special | Carry - | St Reg | TEMP | REFR |
| **SELECT** | | | | | | | | | | | | |
| SELA | 0 0 0 1 1 1 | [(St Reg):(TEMP)] ∧DI→SUC (SUC)(PRIORITY)→SEL | Precede by LT or LTR Priority Activity Select UPT used for extra line | $GR_o$-$GR_7$ | $T_o$→SUC PRIORITY→$T_1$ | Compare word | SEL,1→A $\overline{SEL}$,0→A | ADD | Carry in | R | ($\overline{Temp}$) | REFR |
| SELH | 0 0 0 1 1 0 | [(St Reg):(TEMP)] ∧DI→SUC (SUC)(PRIORITY)→SEL | Precede by LT or LTR Priority Hold Select UPT used for extra line | $GR_o$-$GR_7$ | $T_o$→SUC PRIORITY→$T_1$ | Compare word | SEL,1→A | ADD | Carry - | R | ($\overline{Temp}$) | REFR |
| **TEST STATUS** | | | | | | | | | | | | |
| TS | 0 0 0 1 0 - | [(St Reg:(Temp)] ∧DI→SUC | For Success count only | $GR_o$-$GR_7$ | $T_o$→SUC | Compare word | -- | ADD | Carry - | R | ($\overline{Temp}$) | REFR |
| **CLEAR** | | | | | | | | | | | | |
| CLH | 1 1 1 0 1 0 | -- | Reset hold condition | -- | -- | -- | 0→H | -- | -- | -- | -- | REFR |
| CLSR | 1 1 1 0 1 1 | -- | Initiate circuit | -- | -- | -- | o's→St Reg | -- | -- | -- | -- | REFR |
| **NO OPERATION** | | | | | | | | | | | | |
| NOP | 1 1 1 1 1 1 | -- | Hold Previous state | -- | -- | -- | -- | -- | -- | -- | -- | REFR |

Each of the instructions shown are micro-instructions which are carried out in one cycle time. The add and subtract instructions shown, for instance, can be carried out completely in one cycle time. For the more complex operations, such as a multiply or divide, additional micro-instructions such as load temporary register and MPL instructions are needed to carry out the arithmetic or logic operation. Each of the general registers 30–37 has multiple ports. In the particular registers disclosed there are three ports. Each corresponding port in each register is interrogated simultaneously with data upon which an operation is to be carried out. The ports are selected by the register selects and the refresh control 25–27. The registers 30–37 selected will be determined by the UPR and the UPT inputs from the micro-instruction into the register selects 25 and 26. The UPR and UPT inputs come from the general instructions and not the micro-instructions.

Figure 2:
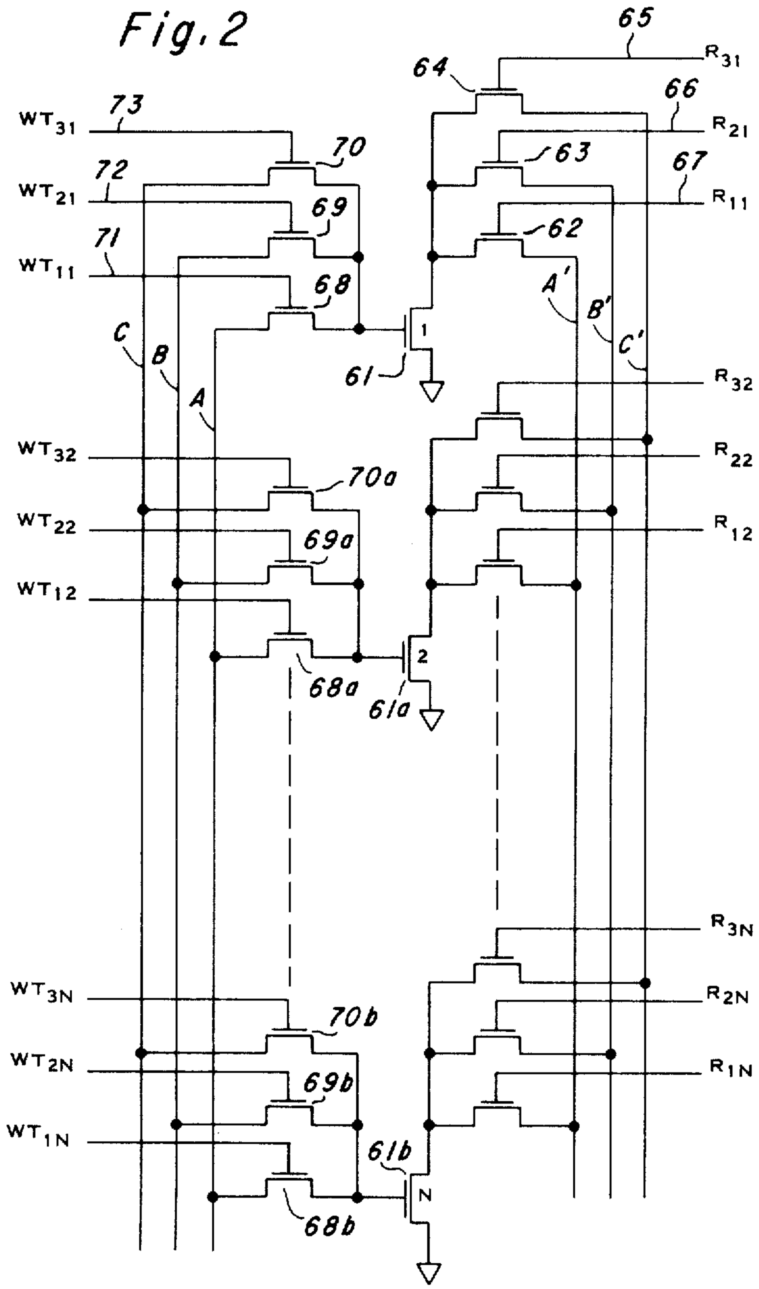
FIG. 2 shows one bit of a register file.

Referring now to FIG. 2, FIG. 2 shows one bit of a 16-bit register file. This will be expanded 16-bits wide for a 16-bit register. In FIG. 2, there are three registers of the general eight registers with the first bit of each register being shown. The general register files 30–37 are shown in FIG. 1 and have eight registers 30–37 with each register having 16 bits. Referring now to the first bit in the first register there is a storage transistor 61. These transistors such as transistor 61 are MOS transistors. There are three output transistors used as output gates to the three output ports. The output transistors are MOS transistors 62–64, leading to output ports A'–C'. The input control lines 65–67 are the read control lines for the output gate transistors 62–64 controlling which output port will be selected to control the read out of information from the corresponding register. The input for the control read line 65–67 are common to all of the 16 bits in the first register. There are three input control gates 68–70 which are controlled by write input lines 71–73 to enable the three input ports A–C.

The transistors 68–70 are transfer gates to control the storage information received on input ports A–C to be stored on the storage MOS transistor 61.

Two MOS storage transistors **61*a* and 61*b*** and their corresponding transfer gates, output transistors, output lines, input lines and control lines are shown in FIG. 2.

The register file 30–37 is dynamic. The information is read out, then it periodically needs to be refreshed or it is lost. Thus there are manipulative blocks as shown in FIG. 3 for each bit so that there are 16 manipulative blocks with each manipulative block connected to all of the bits in corresponding register files.

Figure 3:
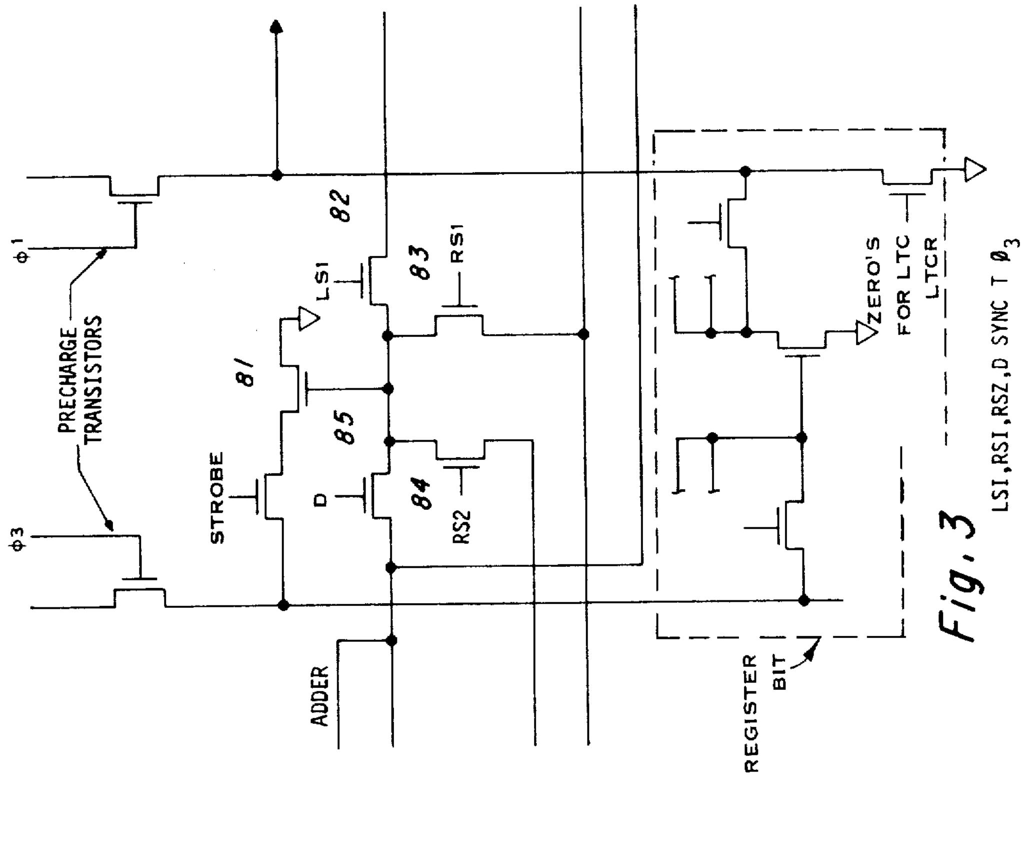
FIG. 3 shows a logic circuit corresponding to circuit 47 in FIG. 1.

Referring to FIG. 3, this logic (corresponding to circuit 47 in FIG. 1) performs a direct, left shift one, right shift one, or right shift two operation on each bit of parallel data read out from the adder/logic circuitry 43. FIG. 3 also shows the inputs to the adder and the output from the adder with the control functions that the logic shown in FIG. 3 carries out on the output data. Port 1 to the adder may be the contents of the general register selected by the UPR field, all ones, or the contents status register. From the adder the control circuit as shown in FIG. 3 will shift the output data to the left, to the right, or direct to the corresponding bit in the selected register 30-37, to the temporary register 39 or transferred directly to the status register 41. A corresponding register bit is shown as register bit 80. The following Table II shows the inputs and outputs.

TABLE II

| TO ADDER | FROM ADDER | |
|---|---|---|
| (UPR) | RS2 | TO UPR |
| 1's | RS1 | TO UPR |
| Status Reg | Direct | TO UPR |
| | LS1 | TO UPR |
| | Direct to Temp | |
| | Direct to Status Reg | |

Referring now to FIG. 3, there is a discharge transistor 81 and transfer transistors 82–85. The transfer transistors 82–85 actually determine where the output from the adder on input terminal 86 is transferred to which discharge transistor 81. Remembering that there is a discharge transistor 81 associated with each bit in the register, there can be an interconnection by the transfer transistors 82–85 to determine whether the output from the adder input 86 will be transferred to the left bit directly, to the corresponding bit, to the right bit or to the second right bit. This can be shown and understood perhaps a little more easily by referring to FIG. 4 which shows the control circuit for three bits of the shift register and to Table III.

TABLE III

P1aO — Bit 13 Output
P1BO — Bit 15 Input for RSZ
P1CO — Bit 15 Input for RSl, Bit 14 Input for RSZ
PZAO — Bit 16 discharge path for X2 Operation
P3AO — Bit 15 discharge path for R1
P3BO — Require Bit 15 discharge path for R1, Bit 14 discharge path for R2
P3CO — Require Bit 15 discharge path for R2
P1AI — Input Require for LSI
P1BI — Bit 1 Output
P1CI — Bit 0 Output
PZAI — Require discharge path for X2, RTO Input
PBAI — Require Bit O discharge path for L1
P3BI — Discharge path for Bit 0 for R2
P3CI — Discharge path in Bit 1 for R2, Bit 0 for R1

In this description transfer transistor 82 controls the input from the adder input to its associated discharge transistor 81. The three bits are labelled X, Y and Z. For instance, the transfer transistor **82*b* with the Y bit will control the output from the Z bit adder through and to the discharge transistor 81 for the Y bit. Transferred transistor 83*b* controls the output of the X bit adder so that it controls the transfer of right one for the X bit to the Y bit. Correspondingly, there is a Y output to the Z bit which is controlled by the transfer transistor 83*c* for the Z bit. For a right shift two, there is a transfer from the X bit by the transfer transistor 83*b* in the Y bit which is turned off so that it transfers directly to the transfer transistor 84*c* in the Z bit to the Z bit discharge transistor 81. The transfer transistor 85** is a direct transfer.

Figure 5:
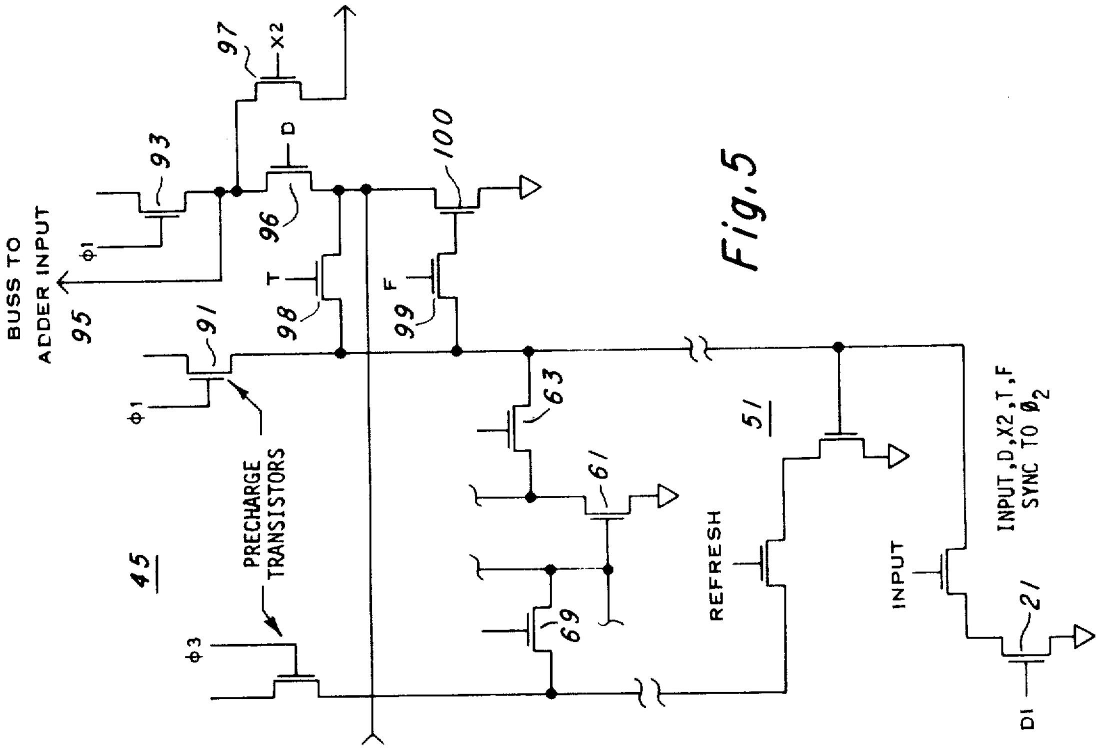
FIG. 5 shows the logic corresponding to logic 45 shown in FIG. 1.

Referring now to FIG. 5, the logic shown corresponds to the logic 45 in FIG. 1. This performs a true complement or a left shift one operation. A storage bit is shown in the form of the register storage transistor 61. In addition, an input to the adder is controlled from this storage bit 61 through port 2. There are two precharge paths out of transistors 91 and 93 with the bus output to the adder on output terminal 95. Transistor 93 precharges the adder through transistors 96 or 97 deciding whether the input to the adder is going to be actually from that corresponding bit or from the adjacent right bit. The transistors 98 and 99 decide whether it would be a true or complement input to the adder. A true input to the adder would be through discharge path 98, 96, through the port 2 selection transistor 63 to the storage transistor 61. A complement input to the adder will be from adder output 95, transistor 96 and 100. Transistor 100 was set up through the transfer transistor 99 from port 2 selection transistor 63 and storage transistor 61.

Figure 4:
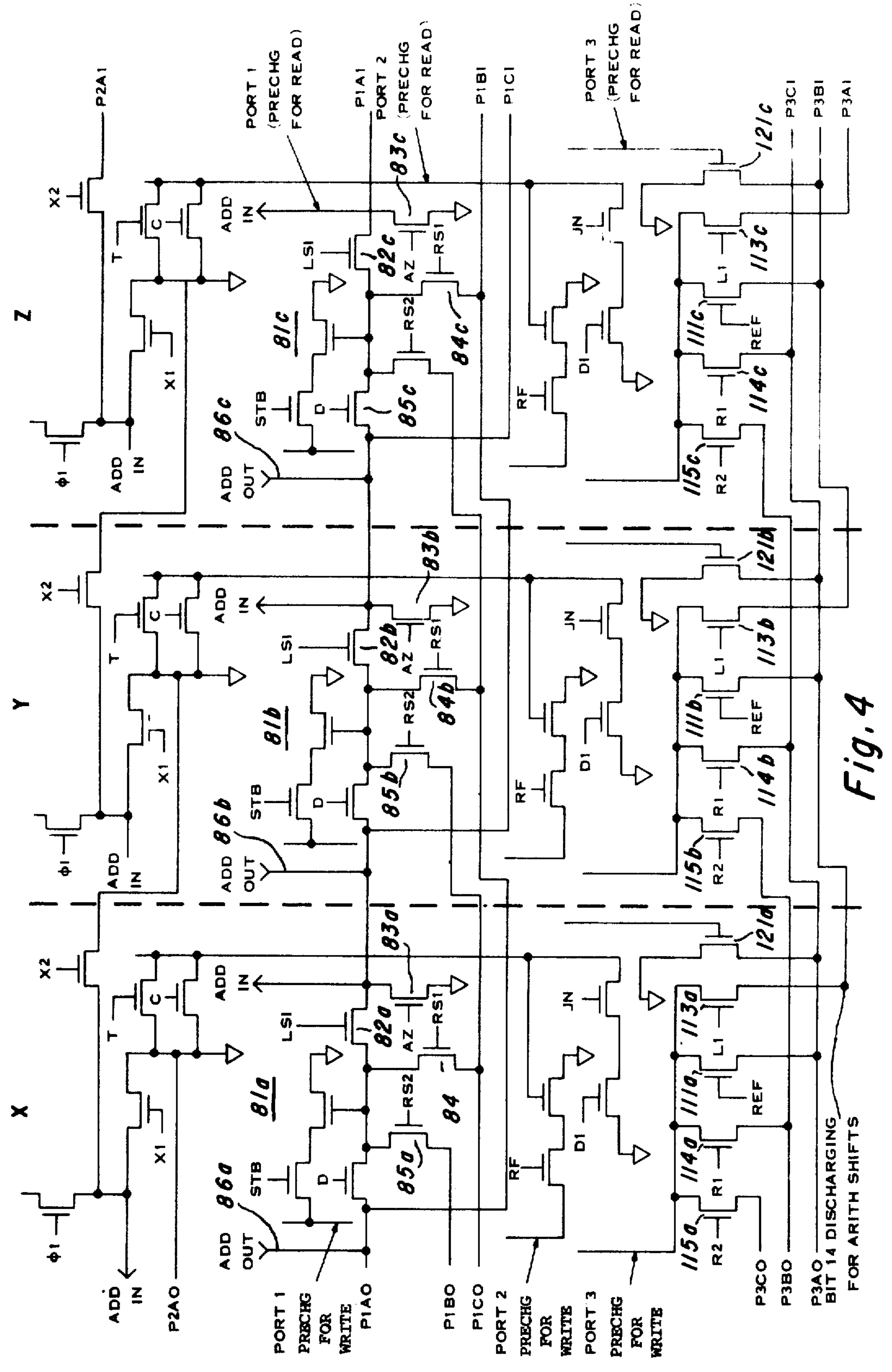
FIG. 4 shows a control circuit for the register file.
Figure 6:
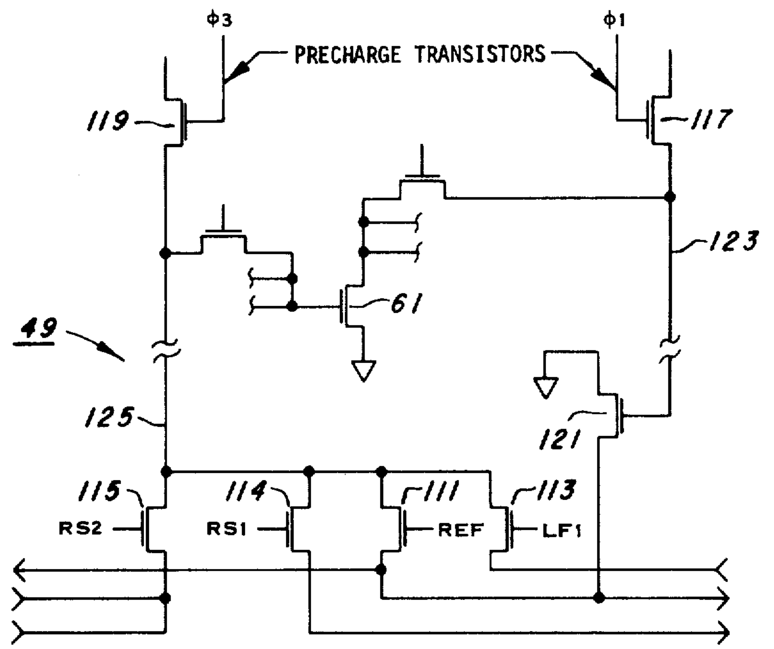
FIG. 6 shows the circuit shown as circuit 49 in FIG. 1.

Refer now to FIG. 6 and also to FIG. 4 for a description of the circuit 49. In FIG. 1 this is called the refresh, left shift one, right shift one, right shift two. Before operation a precharged transistor number 117 is reactivated and precharged to align line 123 to a logic one level. Data has previously been stored on register storage transistor 61, which is the same as register storage transistor 61 shown in FIG. 5, line 123. If a logical "1" had been stored on storage transistor 61 a discharge path will be made available such that line 123 would discharge to a logical "0" presenting a zero input to the gate of transistor 121. The next path of the cycle is with a precharge on transistor 119 to precharge line 125 when the refresh mode is in effect which would go through transistor 111. A discharge path is presented through transistors 111 and 121 with transistor 121 having had a zero stored on it so that transistor 121 would be off and a logic "1" would remain on line 125 which would then be stored on the storage transistor 61. Had a zero previously been stored on storage transistor 61 and a discharge path would not have been available for line 123 to discharge and a logic one would have been left on transistor 121 and the discharge path would exist through transistors 111 and 121 for line 125 to discharge. In a left shift operation, the discharge path is through transistor 113, through the adjacent cell having a transistor corresponding to transistor 121. Therefore, the discharge path of line 123 would then discharge through the adjacent transistor 121 presenting its data on the input to storage transistor 61. For a right shift operation, a discharge path would exist through transistor 114 through the left adjacent cells transistor 121 and its data then would be presented back through to the storage transistor 61 and its cell. For a right shift two operation, the discharge path of line 125 would be through transistor 115 and the left second cells transistor 121 presenting its data on storage transistor 61. This can be seen in FIG. 4.

Figure 7:
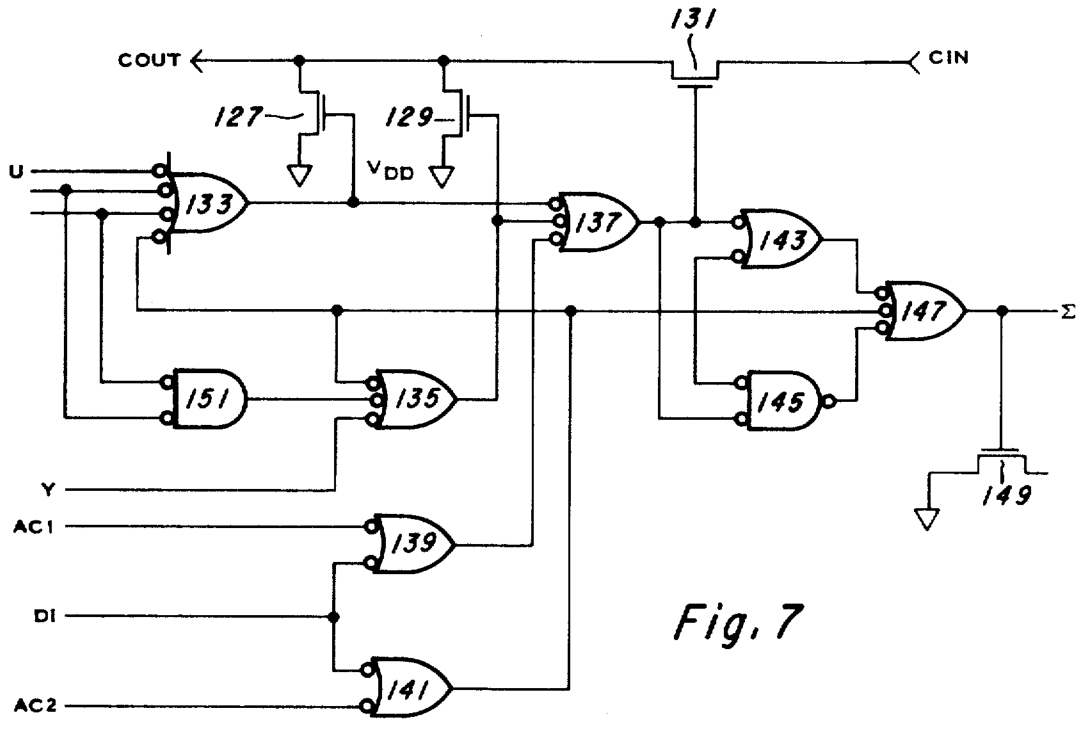
FIG. 7 shows the adder/logic circuit.

Referring now to FIG. 7 and Table IV for a description of the adder/logic functions shown as block 43 in FIG. 1:

TABLE IV

| FUNCTION | | CONTROLS u | v | Ac1 | Ac2 | |
|---|---|---|---|---|---|---|
| AND | AΛB | 1 | 0 | 1 | 1 | Ci=1 |
| OR | AvB | 0 | 1 | 1 | 1 | Ci=0 |
| ADD/SUB | A+B | 0 | 0 | 1 | 1 | |
| COMPARE | A+(−B)ΛDI | 0 | 0 | 1 | 0 | Ci=1 |
| SET | AΛBvDI | 1 | 0 | 0 | 1 | |

The adder circuitry is designed to have as few propagation delays as possible. It is possible because most of the data manipulation is done in the register file. The basic operations of the adder are "and", "or", "add", "compare" and "bit/s set". In general, the carry circuitry is generated within the adder. Gate 133 is the output (A or B) and is used as the input for transistor 127 which is the generate zero transistor. Gate 135 is the generate one output which is the logic (A and B) expression and it drives the gate of transistor 129 which is the generate one transistor. The Exclusive OR output of the first half of the adder which is gate 137 presents the input to transistor 131 which is a propagate transistor for the carry line. The inputs to transistors 127 which is a generate zero, transistor 129 which is a generate one, and transistor 131 which is a propagate transistor, are all mutually exclusive. The carry output goes directly into the carry input of the next adjacent stage. The worst case propagation path for the whole chain of 16 bits will be 16 series transistors of type transistor 131. Gates 132, 145 and 147 are the final Exclusive OR stage of the adder and transistor 149 is being driven by the output of gate 147 and transistor 149 is wired to all stages to present the all zero output of the adder. Gate 139 is used as the set bit in the adder circuitry when the input control to gate 139 is activated. The input lines to the circuitry and the input lines of the unit processor are enabled to gate 137 which presents the expression [A and B or (the input line to the output)]. This is a double masked operation where the masks are B and the input lines, and used to present any value of data in a given register the register being A. Gate 141 is used in COMPARE circuitry. The normal compare in the adder is done on a subtract and when gate 141 is activated through an AC 2 line the input lines to the unit processor are used as a mask. Gate 141 forces the output of the adder to be zero and forces the propagate transistor 131 to be on and transistors 127 and 129 which are the generate zero and generate one transistors respectively to be off. This enables essentially any internal masked out bit to be hidden from the circuitry and the results of the other compare to be transmitted through the corresponding propagate transistors 131. The result is that a compare in the unit processor can be done on any bit, or any combination of bits within the data word.

Neither the status register 41 nor the temporary register 39 offer anything unique. They are operated in the same manner as the registers 36–37 so they are not described. The temporary register operates in the same manner. The status register operates in a similar manner except it is a DC register therefore static.

Figure 8:
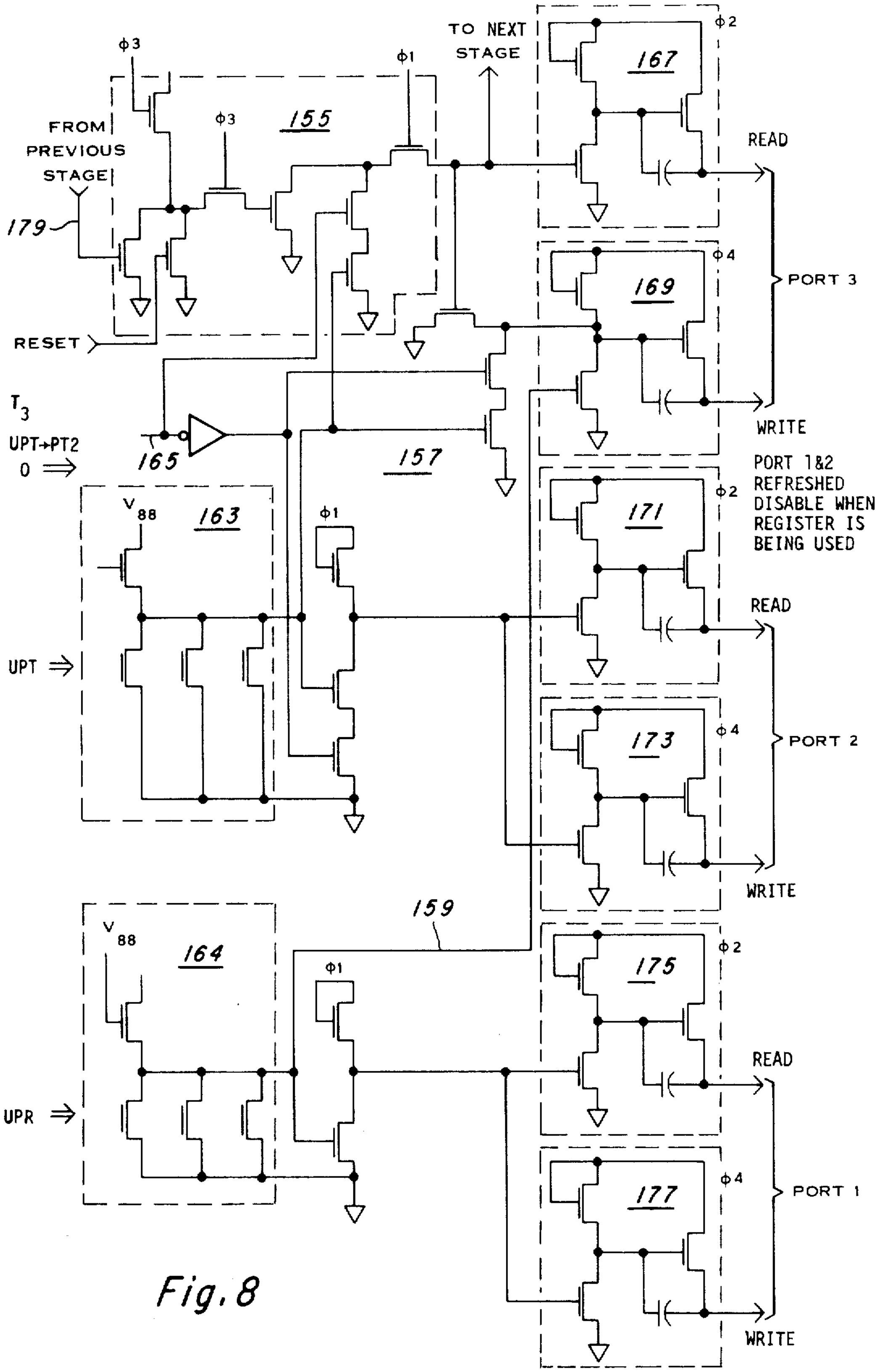
FIG. 8 shows the refresh control and register select circuitry.

Now referring to FIG. 8 for a description of the refresh control 27 and the register selects 25 and 26. FIG. 8 shows one register select and refresh control for one of the registers 30–37. There are eight identical to those shown in FIG. 8 for control of the other seven registers 30–37.

The refresh control will now be described. Block 155 is an implemented dynamic shift register cell. It is hooked up such that line 181 of one stage is connected to line 179 of the next stage. Line 181 of one stage output is connected to line 179 of its next stage and this is then interconnected all the way around the eight registers to form a ring counter. In the ring counter mode, then a bit is shifted through the ring counter and when that bit is at a given register file then a refresh is performed on that register in the file. Now, block 163 and block 164 are the corresponding port 2 and port 1 register decode. They have control lines 157 and 159 correspondingly going to the output of the refresh which is port 3 driver output block 169. This serves the function such that if port 2 or port 1 has an operation being performed on it and meanwhile the ring counter is in such a position that a refresh will be performed on one of those same two registers being operated on, then the refresh would be inhibited at the time that the operation is being carried out in either port 1 or port 2. Therefore, a refresh and operation cannot be performed on the same register at the same time. The shift register stage 155 has its output to read driver 167 of port 3 and in the next half of the cycle the following write driver 169 is activated. Input 165 is used to enable use of port 3 as a register designator when line 165 is initiated to the logic "1", the decode circuitry of port 2 which is block 163 is inputted to the second stage of block 155. Therefore the port 2 input is decoded and gate 163 is activated on the corresponding read and write drivers of port 3. In this operation the decode circuitry 163 is inhibited from the port 2 output. When in this operation port 2 is usually applied from either the status register or the temporary register and is not required to designate another designation. Block 164 is always used as a register decode for port 1 and its corresponding outputs are the read driver 175 and the write driver 177.

In FIG. 5, to explain the overlap clocking system; in normal operation you have a clock time on the precharge transistor which precharges during that time to precharge the data line input. Following that there is a discharge time when transistor 69 is activated presenting, the discharge path through the refresh transistor and the conditional discharge transistor 51. The results of the conditional discharge is put on the storage transistor 61. This discharge timing clock is overlapped such that the precharged line never actually gets all the way charged. After it is on about half of its time, the refresh is initiated in the transfer gate 69. On the previous cycle transistor 51 was set to a zero or a one, whatever its discharge path has been. The precharge line will not be fully charged, so if a one was stored it does not take as long to discharge the line. It does not take a full cycle because it never gets all the way up if a discharge path does exist. Table V showns possible port 2 options.

TABLE V

| TO ADDER | REFRESH |
|---|---|
| (UPT) | DI |
| ($\overline{\text{UPT}}$) | ($\overline{\text{DI}}$) |
| (UPT)X2 | (Temp) |
| ($\overline{\text{UPT}}$)X2 | ($\overline{\text{Temp}}$) |
| 0's (1's) | (Temp)X2 |
| Status Reg | ($\overline{\text{Temp}}$)X2 |

The shift/two complement is used in the register file rather than the adder to give increased speed as shown in FIG. 5 for the port 2 input to the adder.

In the description of the adder there was a simplified factor add and carry. The carry circuit in the adder is greatly enhanced by the fact that implemented in MOS, which is bi-directional, only three transistors are used in each stage of the carry circuit, which are the generate zero, generate one and the propagate transistors. Speed is enhanced by the fact that a worst case propagate signal is only 16 transistors in serial which is either a discharge path or a charge path.

What is claimed is:

1. An MOS data processor fabricated on a single semiconductor chip comprising:

an adder circuit included in said MOS data processor, each stage having a plurality of outputs, said adder circuit having a plurality of stages, and a carry circuit in each stage of said adder, each carry circuit including first, second and third MOS transistors, the first transistor responsive to an adder output for generating a zero carry, the second transistor responsive to an adder output for generating a one carry, and the third transistor responsive to an adder output for propagating either a one carry or a zero carry to one of said plurality of stages.

2. The MOS data processor claimed in claim 1 in which a carry input and a carry output are provided for each stage, and the third transistor is in series with the carry input and carry output.

* * * * *